United States Patent [19]
Williams

[11] 3,753,479
[45] Aug. 21, 1973

[54] CAM AND SPRING OPERATED POSITIVE CLUTCH

[75] Inventor: Richard D. Williams, Vancouver, Wash.

[73] Assignee: Warm-Belleview Inc., Portland, Oreg.

[22] Filed: Jan. 17, 1972

[21] Appl. No.: 218,191

[52] U.S. Cl. ........... 192/89 A, 192/67 R, 192/89 R, 192/95, 287/53 R
[51] Int. Cl. .......................................... F16d 11/04
[58] Field of Search ............. 192/89 R, 89 A, 67 R, 192/95

[56] References Cited
UNITED STATES PATENTS

| | | | |
|---|---|---|---|
| 3,442,361 | 5/1969 | Hegar | 192/109 A |
| 3,092,229 | 6/1963 | Uher | 192/103 F |
| 3,184,258 | 5/1965 | Kapusta | 192/67 R X |
| 3,669,476 | 6/1972 | Wilson | 192/67 R X |

*Primary Examiner*—Benjamin W. Wyche
*Attorney*—Stephen W. Blore, Joseph B. Sparkman et al.

[57] ABSTRACT

A wheel hub clutching mechanism has a dial which, when turned to a "lock" position moves an actuator cam to permit primary springs to move the clutch into mesh with the shaft driven pinion. When the dial is moved to a "free" position it moves the actuator cam to permit secondary springs to move the clutch out of mesh with the pinion.

9 Claims, 8 Drawing Figures

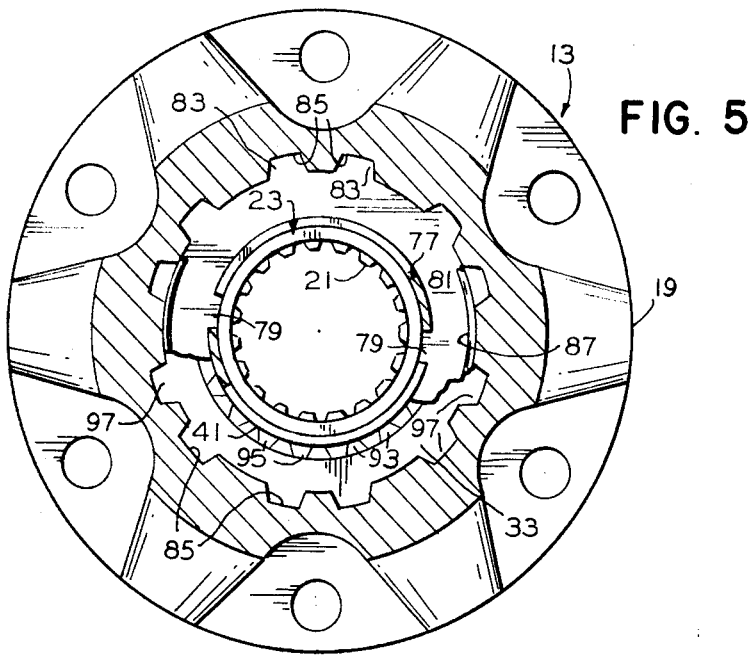
FIG. 5
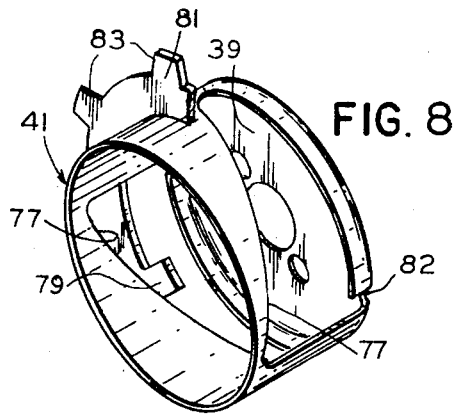
FIG. 8
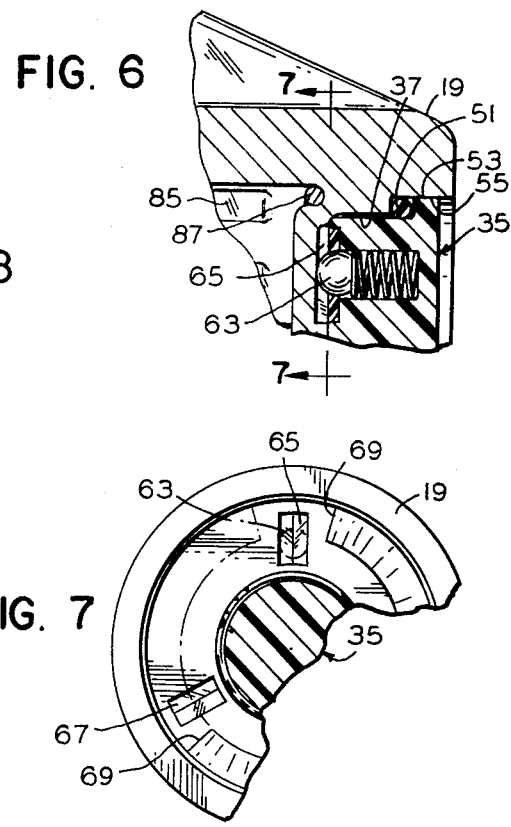
FIG. 6
FIG. 7

CAM AND SPRING OPERATED POSITIVE CLUTCH

This invention relates to an improved wheel hub clutching mechanism, and more particularly to an improved attachable-detachable hub clutching mechanism.

An object of the invention is to provide a new and improved wheel hub clutching mechanism.

Another object of the invention is to provide a new and improved attachable-detachable hub clutching mechanism.

A further object of the invention is to provide a hub clutching mechanism including a clutch ring urged selectively toward either engaged or disengaged positions and a follower urged toward engaged position and moved positively to disengaged position.

Another object of the invention is to provide a hub clutching mechanism having a simple, rugged cam mechanism and simple compression springs to move a clutch member urgingly into and out of clutching condition.

In the drawings:

FIG. 5 is a vertical sectional view taken along line 5—5 of FIG. 4;

FIG. 6 is an enlarged sectional view taken along line 6—6 of FIG. 3;

FIG. 7 is a vertical sectional view taken along line 7—7 of FIG. 6; and

FIG. 8 is an enlarged perspective view of a cam of the clutching mechanism of FIG. 1, and showing part of the associated follower.

Figure 1:
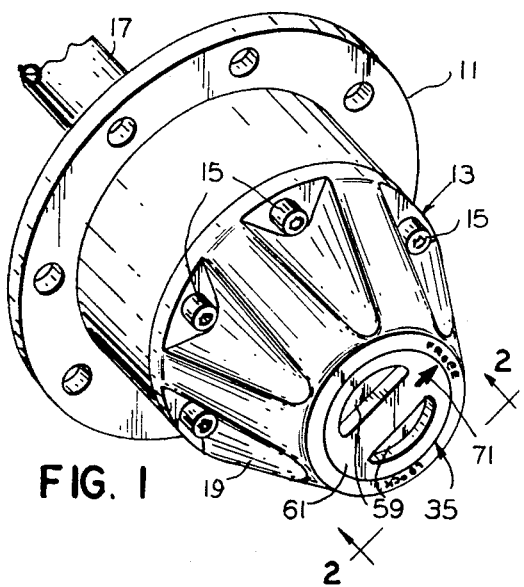
FIG. 1 is a fragmentary perspective view of a front wheel hub clutching mechanism forming one embodiment of the invention.

Referring now in detail to the drawings, there is shown therein a clutching mechanism forming one embodiment of the invention and including a vehicle front hub 11 and a front wheel hub clutching mechanism 13. The mechanism 13 is mounted on the hub by capscrews 15 and permits the torque from a drivable front axle or shaft 17 to be coupled to and uncoupled from the wheel carrying hub 11 to selectively provide two-wheel or four-wheel drive. The axle 17 is provided with a splined end portion fitting in a splined bore 21 of a pinion 23 mounted rotatable in a bushing portion 25 of a nylon pilot member 27 which fits in a stepped bore in a cupped body 19 of the mechanism 13. The pilot member 27 also acts as a seal and is maintained on the pinion by a slot retaining ring 29 in groove 31 in pinion 23. The pilot member also has keying lugs fitting into splining 85 in the body 19.

Whenever the front axle 17 is rotated, it rotates the pinion 23. When coupling member or hub clutch ring 33 is free, as shown in FIG. 3, the pinion 23 just idles to provide free wheeling of the hub. The mechanism 13 is provided with a flanged, manually operable, control dial 35 rotatably mounted in a bore in outer end of body 19 and is attached to rear wall 39 of an actuator cam 41 by screws 43. A dust seal 51 between the periphery 53 of the dial 35 and a counterbore 55 in the outer end of body 19, and an O-ring oil seal 57 are provided to maintain a clean and dry assembly. Finger grip recesses 59 (FIG. 2) are provided in face 61 of the dial 35 for manually turning the dial 35 between a lock position and a free position. A spring loaded detent 63 (FIG. 6) drops into notch 65 when the dial is in the free position and drops into a notch 67 (FIG. 7) when the dial is in the lock position. Stops 69 are provided in the body 19 to limit travel of the dial 35 in each direction. The arrow 71 (FIG. 2) on the face 61 of the dial 35 is aligned with dot 73 for the "free" position or dot 75 for the "lock" position.

Figure 3:
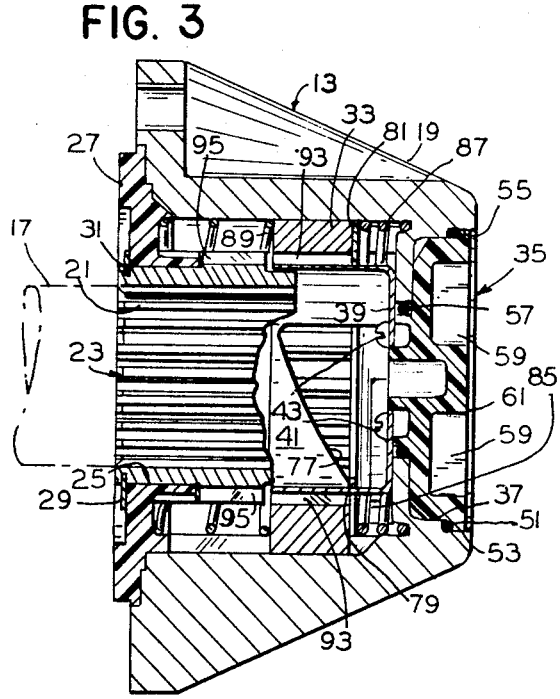
FIG. 3 is a vertical sectional view taken along line 3—3 of FIG. 2.
Figure 4:
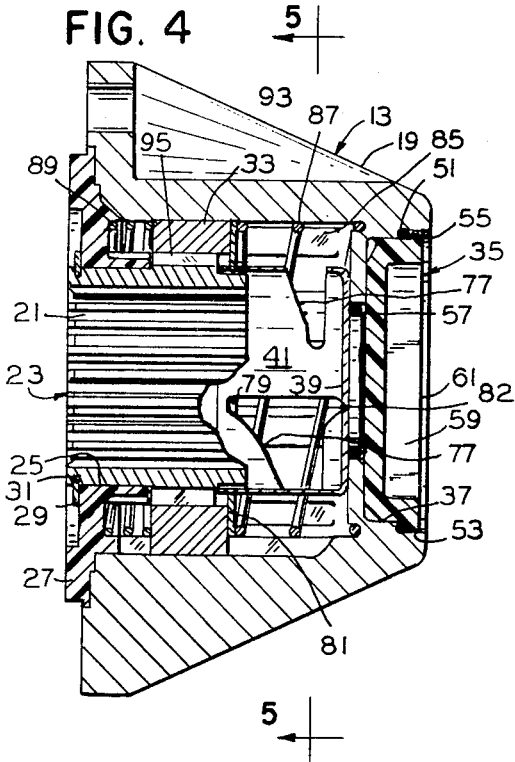
FIG. 4 is a vertical sectional view like FIG. 3 with parts moved for convenience of illustration.

The cam 41 (FIG. 8) is cupped and cylindrical, and has two cam portions 77 that guide a pair of follower tabs 79 formed on a follower plate or washer 81. The cam has clearance notches 82 to permit the follower tabs to pass therethrough for assembling the follower plate with the cam. The follower washer has splining lugs 83 guided in spline slots 85 in the body 19 so that turning of the cam 41 from its disengaged position to its engaged or lock position permits strong compression spring 87 to push the follower plate 81 and the hub clutch ring 33 from the free positions thereof shown in FIG. 3 to the lock positions thereof shown in FIG. 4, the strong spring 87 overcoming the force of a weaker return spring 89. In the event that the clutch ring 33 and the pinion 31 do not initially mesh as the dial 35 is moved from the free position to the lock position, the spring 87, being in compression, will push the clutch ring into mesh with the pinion as the pinion is rotated a slight amount, and the spring 87 maintains the clutch ring in the meshing position until it is desired to free the hub. The spring loaded detent is held in lock notch 67 preventing the dial 35 from rotating.

Figure 2:
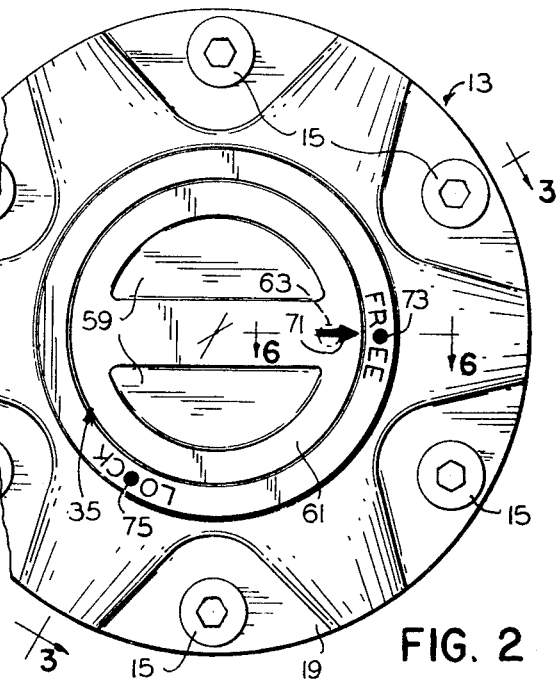
FIG. 2 is an enlarged fragmentary end view taken along line 2—2 of FIG. 1.

When four-wheel drive condition is not needed, the wheel hub is released by manually rotating the dial 35 to the free position shown in FIG. 2. This rotation of the dial rotates the cam 41, which is fixed rigidly to the back side of the dial 35, to cause lobes 77 to push the tabs 79 of the follower plate 81 to the right, as viewed in FIG. 4, to compress the strong spring 87 to its condition shown in FIG. 3. This permits the disengagement spring 89 to move the clutch ring 33 off and out of engagement with the pinion 23, internal splining teeth 92 of the clutch ring moving out of engagement with external splining teeth 95 on pinion 23. Should any preload cause friction between the splines 93 and 95 which prevents disengagement of the meshed pinion 23 and ring 33, then the spring 89 will remain compressed until the preload is released and the ring 33 can be urged out of engagement. External splining teeth 97 (FIG. 5) of the clutch ring spline with the internal spline slots 85 in the body 19 and guide the clutch ring 33 as it is engaged and disengaged with the pinion 23.

The follower washer 81 is released by the cam for clutch engagement, and is positively retracted to permit clutch disengagement, and the clutch ring 33 is urged or impositively moved in both directions.

What is claimed is:

1. In a wheel hub clutching mechanism,
a body having internal splining,
a pinion having external splining,
a clutch ring continuously splined to the body and axially movable between a disengaged position free of the pinion and an engaged position meshing with the external splining,
strong spring means, follower means splined to the body and interposed between said strong spring means and said clutch ring, said strong spring means being a predetermined strength urging the follower washer toward the clutch ring and urging the clutch ring toward its engaged position, weak spring means weaker than said predetermined strength urging the clutch ring toward its disengaged position and being isolated from the cam means recited below, and manually operable cam means movable in one direction to retract the follower means positively to a position permitting movement of the clutch ring to its disengaged position and movable in the opposite direction to permit the follower means to move the clutch ring to its engaged position.

2. The wheel hub clutching mechanism of claim 1 wherein the cam means includes a drum cam.

3. The wheel hub clutching mechanism of claim 2 wherein the cam means includes a dial and the cam is cupped and has an end portion secured to the dial and rotatable therewith.

4. The wheel hub clutching mechanism of claim 3 wherein the cam and the dial abut opposite faces of and are rotatable relative to an internal annular flange in the body.

5. The wheel hub clutching mechanism of claim 2 wherein the drum cam has end notches and the follower means comprises a washer having follower tabs adapted to pass through the end notches in the drum cam.

6. The wheel hub clutching mechanism of claim 1 wherein there is a pilot member interposed between said body and said pinion, said weak spring means comprising a compression spring interposed between said pilot member and clutch ring.

7. The wheel hub clutching mechanism of claim 6 including a split ring retainer securing a bushing portion of the pilot member on the pinion.

8. The wheel hub clutching mechanism of claim 2 wherein the follower means comprises a washer fitting closely, rotatably and slidably on the drum cam.

9. In a wheel hub clutching mechanism, a body having internal splining, a pinion, clutch means in the body and splined thereto by the internal splining, and movable from an outer position in which it is disengaged from said pinion to an inner position in which it is engaged with said pinion, and manually operable means having an outer position and an inner position, springs means stressed when the clutch means and manually operable means are in their outer positions so as to normally urge the clutch means toward engagement with the pinion and to a condition stressed when the clutch means and manually operable means are in their inner positions to urge the clutch means toward disengagement from the pinion, said manually operable means in its outer position preventing movement of said clutch ring to its engaged position under the influence of said spring means, and when in its inner position permitting the spring means to urge the clutch means toward engagement with the pinion, and to facilitate stressing said spring means so as to urge disengagement of said clutch means when said clutch means is in its engaged position.

* * * * *